United States Patent
Wosylus et al.

(10) Patent No.: US 10,800,926 B2
(45) Date of Patent: Oct. 13, 2020

(54) NON-MAGNETIZABLE EFFECT PIGMENTS

(71) Applicant: BASF SE, Ludwigshafen (DE)

(72) Inventors: Aron Wosylus, Bad Duerkheim (DE); Raimund Schmid, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/917,354

(22) PCT Filed: Sep. 16, 2014

(86) PCT No.: PCT/IB2014/064543
§ 371 (c)(1),
(2) Date: Mar. 8, 2016

(87) PCT Pub. No.: WO2015/040537
PCT Pub. Date: Mar. 26, 2015

(65) Prior Publication Data
US 2016/0215147 A1    Jul. 28, 2016

(30) Foreign Application Priority Data
Sep. 19, 2013  (EP) .................................. 13185196

(51) Int. Cl.
*C09C 1/64*  (2006.01)
*C23C 22/02*  (2006.01)
(Continued)

(52) U.S. Cl.
CPC ............ *C09C 1/642* (2013.01); *C09C 1/0021* (2013.01); *C23C 22/02* (2013.01); *C23C 26/00* (2013.01); *C01P 2002/54* (2013.01); *C01P 2002/85* (2013.01); *C01P 2006/42* (2013.01); *C01P 2006/60* (2013.01); *C09C 2200/1058* (2013.01); *C09C 2220/103* (2013.01)

(58) Field of Classification Search
CPC .............. C01P 2002/54; C01P 2002/85; C01P 2006/42; C01P 2006/60; C09C 1/0021; C09C 1/642; C09C 2200/1058; C09C 2220/103; C23C 22/02; C23C 26/00
See application file for complete search history.

(56) References Cited

U.S. PATENT DOCUMENTS

| | | | |
|---|---|---|---|
| 7,387,669 B2 | 6/2008 | Mronga et al. | |
| 7,419,538 B2 | 9/2008 | Li et al. | |

(Continued)

FOREIGN PATENT DOCUMENTS

| | | | |
|---|---|---|---|
| CN | 1538995 A | 10/2004 | |
| CN | 1875074 A | 12/2006 | |

(Continued)

OTHER PUBLICATIONS

Combined Chinese Office Action dated Apr. 28, 2017 in Patent Application No. 201480050707.1 (with English Translation).
(Continued)

*Primary Examiner* — Shuangyi Abu Ali
(74) *Attorney, Agent, or Firm* — Oblon, McClelland, Maier & Neustadt, L.L.P.

(57) ABSTRACT

The present invention relates to a coloured effect pigment, comprising a substrate made of aluminium or an aluminium alloy which is optionally coated with one or more passivation layers, and an aluminium-doped iron oxide layer.

15 Claims, 3 Drawing Sheets

(51) Int. Cl.
*C23C 26/00* (2006.01)
*C09C 1/00* (2006.01)

(56) References Cited

U.S. PATENT DOCUMENTS

| | | |
|---|---|---|
| 2006/0121205 A1 | 6/2006 | Menovcik et al. |
| 2007/0104663 A1 * | 5/2007 | Henglein .............. C09C 1/0015 424/61 |
| 2013/0251771 A1 * | 9/2013 | Shimizu .................. C09D 7/70 424/401 |
| 2015/0020712 A1 | 1/2015 | Wosylus et al. |
| 2015/0104573 A1 | 4/2015 | Wosylus et al. |

FOREIGN PATENT DOCUMENTS

| | | |
|---|---|---|
| CN | 101248617 A | 8/2008 |
| CN | 101348617 A | 1/2009 |
| DE | 44 05 492 A1 | 8/1995 |
| DE | 198 36 810 A1 | 2/2000 |
| EP | 0 033 457 A2 | 8/1981 |
| EP | 0 647 593 A1 | 4/1995 |
| EP | 0 668 329 A2 | 8/1995 |
| EP | 0 688 833 A2 | 12/1995 |
| EP | 0 708 154 A2 | 4/1996 |
| EP | 1 553 144 A1 | 7/2005 |
| EP | 1 682 622 | 7/2006 |
| EP | 1 904 587 | 4/2008 |
| JP | H07-277738 A | 10/1995 |
| JP | 10-330657 A | 12/1998 |
| JP | 2002-522618 A | 7/2002 |
| JP | 2004-214084 A | 7/2004 |
| JP | 2005-120187 A | 5/2005 |
| JP | 2007-510022 A | 4/2007 |
| JP | 2007-511655 A | 5/2007 |
| JP | 2011-174065 A | 9/2011 |
| WO | WO 99/57204 A1 | 11/1999 |
| WO | 2005/049739 A2 | 6/2005 |
| WO | WO 2006/041658 A1 | 4/2006 |
| WO | 2006/062666 A1 | 6/2006 |
| WO | WO-2012076110 A1 * | 6/2012 ........... C09C 1/0015 |
| WO | WO 2013/156327 A1 | 10/2013 |
| WO | WO 2013/175339 A1 | 11/2013 |

OTHER PUBLICATIONS

Extended European Search Report dated Jul. 7, 2017 in Patent Application No. 14845588.4.

Fahmida Gulshan, et al., "Preparation of Alumina-Iron Oxide Compounds by Coprecipitation Method and Its Characterization", American Journal of Materials Science and Engineering, XP002720381, vol. 1, No. 1, 2013, pp. 6-11.

G. M. da Costa, et al., "Al hematites prepared by homogeneous precipitation of oxinates: material characterization and determination of the Morin transition", Physics and Chemistry of Minerals, XP002720382, vol. 29, 2002, pp. 122-131.

International Search Report dated Jan. 16, 2015 in PCT/IB14/64543 Filed Sep. 16, 2014.

Office Action dated Jul. 2, 2018 in Japanese Patent Application No. JP 2016-543476 (w/ English translation).

Japanese Office Action dated Apr. 8, 2019 in Patent Application No. 2016-543476, 3 pages.

* cited by examiner

FIG 3

NON-MAGNETIZABLE EFFECT PIGMENTS

Luster or effect pigments are used in many areas, for example in automotive coatings, decorative coatings, plastics pigmentation, paints, printing inks, and cosmetics.

The optical effect is based on the directed reflection of light at predominantly sheet-like, parallel-oriented, metallic or strongly refractive pigment particles. Depending on the composition of the pigment platelets, there are interference, reflection and absorption phenomena which create angular-dependent color and lightness effects.

Metallic effect pigments are all of the platelet-shaped substrates known to the skilled worker, examples being aluminium plates or metal oxide-coated aluminium plates.

Platelet-shaped aluminium pigments having a coating of iron oxide are well known and described e.g. in EP 0 033 457. They belong to the class of effect pigments which, by virtue of their particular color properties, have found wide use in the coloration of coatings, paints, printing inks, plastics, ceramic compositions and glazes and decorative cosmetic preparations.

Iron oxide coated aluminium pigments derive their particular optical profile from a combination of specular reflection at the surface of the aluminium platelet, selective light absorption in the iron oxide layer and light interference at the film-like surfaces of the iron oxide layer. Light interference leads to a color which is mainly determined by the thickness of the iron oxide layer. Dry pigment powders therefore exhibit the following hues in air with increasing iron oxide layer thickness which are classified as due to 1st order or 2nd order interference:

1st order interference colors: pale yellow, green-gold, gold, reddish-gold, red, violet, grayish-violet;
2nd order interference colors: yellow, gold, reddish-gold, red-gold, red.

Iron oxide coated aluminium pigments are very bright and opaque, which is why they are widely used in automotive coatings. The pigments customarily used in this field are based on aluminium platelets and exhibit a metallic mirror effect.

Metal oxide layers of effect pigments can be provided on the metallic substrate particles by gas phase decomposition of volatile metal compounds in the presence of oxygen and/or water vapor or by a wet-chemical coating process (e.g. sol-gel process).

EP 0 033 457 A2 describes a process for the preparation of colored effect pigments comprising a metallic substrate whose surface is at least partially covered with an iron oxide, wherein iron pentacarbonyl is oxidized to iron oxide in a fluidized bed of the metallic substrates with oxygen at above 100° C.

In wet-chemical preparation methods, metal oxide containing layers can be applied by hydrolytic reaction of appropriate metal salts, e.g. iron(III) salts such as iron(III) chloride and sulfate, iron(III) nitrate, or hydrolysable organometallic compounds.

Details about the preparation of a metal oxide coating layer on a metal-based substrate of an effect pigment are provided e.g. in EP 0 708 154 A2.

DE 19836810 describes the preparation of passivated and iron oxide coated aluminium flakes in a one-step process using an aqueous coating medium.

Typically, the coloured pigment material obtained from the wet-chemical preparation method is subjected to a thermal treatment step so as to provide the final coloured effect pigment. A metal oxide layer prepared via a wet-chemical preparation method may contain hydroxyl groups due to incomplete condensation reaction of hydrolysed precursor species or bound water. For coloristic reasons, conversion of the hydroxide-containing layer into the oxide layer during the manufacturing process is preferred so as to avoid any undesired pigment color shift in the applied pigment-containing product. Conversion of the hydroxide-containing layer into the final oxide layer is typically accomplished by drying in a drying furnace.

However, if the metal substrate of the effect pigment comprises aluminium, such a drying step may trigger an aluminothermic reaction.

Aluminothermic reactions are highly exothermic chemical reactions between aluminium acting as a reducing agent and a metal oxide such as iron oxide or titanium oxide. The most prominent example is the thermite reaction between aluminium and iron oxide. However, aluminium may also react with a titanium oxide or other oxides such as $SiO_2$.

For reducing the risk of triggering an aluminothermic reaction, final heat treatment can be carried out at lower temperature. Alternatively, heat treatment in a high boiling organic solvent can be applied. However, it has turned out that the formation of magnetic or magnetizable iron oxide components is promoted under such conditions, thereby resulting in a magnetic or magnetizable pigment. For a number of applications, it is preferred or even necessary to have a non-magnetic effect pigment.

WO 2005/049739 describes an effect pigment comprising an aluminium-based substrate, a porous aluminium oxide and/or aluminium hydroxide layer, and an iron oxide layer which partly penetrates the pores of the $Al_2O_3/AlOOH$ layer, thereby generating an intermediate layer with alternating areas of pure $Al_2O_3/AlOOH$ and pure iron oxide. The effect pigments described in WO 2005/049739 lead to soft flop characteristics.

It is an object of the present invention to provide an iron oxide containing effect pigment which is non-magnetic even if obtained with a final heat treatment step under mild temperature conditions. Preferably, the optical properties of the non-magnetic iron oxide containing effect pigment include pronounced flop characteristics (light/dark contrast) and a brilliant colour. A further object of the present invention is to provide a process for preparing a non-magnetic iron oxide containing effect pigment.

The object is solved by a coloured effect pigment, comprising
   a substrate made of aluminium or an aluminium alloy which is optionally coated with one or more passivation layers, and
   an aluminium-doped iron oxide layer.

In the present invention, it has been realized that doping the iron oxide layer on the aluminium-based substrate (which may optionally be passivated) with aluminium results in an effect pigment which is non-magnetic or non-magnetizable but still shows pronounced flop characteristics (light/dark contrast) and a brilliant colour.

As the present invention addresses pigment materials, the term "substrate" relates to a particulate substrate, e.g. in the form of flakes or platelets as discussed below in further detail.

The substrate is made of aluminium or aluminium alloy, preferably in the form of flakes or platelets. As an exemplary aluminium alloy, aluminium bronze can be mentioned. The aluminium or aluminium alloy platelets or flakes are producible in a simple manner by breaking out of foils or by common atomizing and grinding techniques. Suitable aluminium or aluminium alloy platelets are produced for example by the Hall process by wet grinding in white spirit.

The starting material is an atomized, irregular aluminium grit which is ball-milled in white spirit and in the presence of lubricant into platelet-shaped particles and subsequently classified.

Average thickness and average diameter of aluminium or aluminium alloy platelets or flakes can be varied over a broad range. Typically, average thickness of the platelets or flakes can be within the range of 10 nm to 1000 nm, and average diameter can be within the range of 8 µm to 50 µm. Typically, the ratio of average diameter to average thickness can be within the range of 30 to 5000.

Optionally, the aluminium or aluminium alloy is coated with a passivating layer. Appropriate passivating layers are generally known to the skilled person. The passivating layer is preferably an inorganic layer such as a metal phosphate layer, or an inorganic oxide layer. If the inorganic passivating layer is a metal phosphate layer, the metal can be selected from Ti, V, Cr, Mn, Fe, Co, Ni, Cu, Zn, Al, Zr, Nb, Mo, Ta or W. If the inorganic passivating layer is an inorganic oxide layer, the oxide can be selected from Ti, V, Cr, Mn, Fe, Co, Ni, Cu, Zn, Al, Zr, Nb, Mo, Ta, W, Ge, Si, Sn and Bi oxides or any combinations thereof. If one or more passivating layers are present, it is preferred that that the outermost passivating layer is not an aluminium oxide layer, an aluminium hydroxide layer, an aluminium oxide hydroxide layer, or any combination thereof. In a preferred embodiment, the outermost passivating layer is $SiO_2$ or $TiO_2$ or a combination or mixture thereof.

In principle, a passivating layer can be produced by a wet-chemical method (e.g. using a precursor compound which is hydrolyzed and forms the passivation layer) or a chemical vapour deposition (CVD) method. Methods for preparing a passivating layer on an effect pigment substrate such as aluminium platelets are generally known to the skilled person. In the wet-chemical process, appropriate precursor compounds such as organic silicon and/or aluminium compounds in which the organic groups are bonded to the metals via oxygen atoms are hydrolyzed in the presence of the substrate particles (e.g. aluminium flakes or platelets) and of an organic solvent in which the metal compounds are soluble. Preferably, a metal alkoxide (especially tetraethoxysilane and aluminium triisopropoxide) is hydrolyzed in the presence of an alcohol (e.g. ethanol or isopropanol) and a basic or acid catalyst (e.g. aqueous ammonia and/or amines). This is preferably done by initially charging substrate particles, isopropanol, water and ammonia, heating this mixture to from 40° C. to 80° C., with stirring and continuously adding a solution of the metal alkoxide in isopropanol. Following a subsequent stirring time of usually from 1 to 15 h, the mixture is cooled down to room temperature, and the coated pigment is isolated by filtering off, washing and optionally drying. Further details about the method of preparing a passivating layer on aluminium are provided e.g. in EP 0 708 154 A2 and DE 4405492 A.

As will be discussed below in further detail, the preparation of the passivation layer on the aluminium-based pigment substrate may also include a thermal treatment step in a liquid medium containing one or more high boiling organic liquids.

Preferably, the aluminium or aluminium alloy (preferably in the form of flakes or platelets) of the substrate is not subjected to any wet-chemical oxidation as this may reduce the pronounced flop characteristics and also generates undesired hydrogen gas in the preparation process.

The Al-doped iron oxide layer can be applied directly on the substrate (i.e. either on the aluminium or, if present, on the outermost passivation layer of the substrate). However, in principle, the coloured effect pigment may additionally comprise one or more intermediate coating layers in between the substrate and the Al-doped iron oxide layer.

Preferably, the Al-doped iron oxide layer is not applied onto (i.e. is not in contact with) an aluminium oxide layer, an aluminium hydroxide layer, an aluminium oxide hydroxide layer, or a combination thereof; in particular not onto a porous aluminium oxide layer, a porous aluminium hydroxide layer, a porous aluminium oxide hydroxide layer, or a combination thereof.

Preferably, the amount of Al dopant is such that no separate $Al_2O_3$, $Al(OH)_3$ nd/or $AlO(OH)$ phase is formed in the Al-doped iron oxide layer. The formation of $Al_2O_3$, $Al(OH)_3$ and/or $AlO(OH)$ phases in the Al-doped iron oxide layer can be detected by analytical means known to the skilled person, such as transmission electron microscopy (TEM) in combination with energy dispersive X-ray spectroscopy (EDXS).

Preferably, the aluminium-doped iron oxide layer contains up to 10 wt % Al, based on the total amount of Fe and Al atoms in the aluminium-doped iron oxide layer.

The aluminium concentration in the iron oxide layer was determined by transmission electron microscopy (TEM) in combination with EDXS (energy dispersive X-ray spectroscopy).

Transmission Electron Microscopy (TEM) samples were prepared by ultramicrotomy and investigated on a Tecnai G2-F20ST machine (FEI Company, Hillsboro, USA) operated at 200 keV. Energy Dispersive X-ray spectroscopy (EDXS) was applied to determine chemical compositions at distinct spots of the sample using an EDXi-detection system with an energy resolution of 131 eV at Mn-Kα (EDAX, Mahwah, USA). Images and spectroscopy data were evaluated using the Olympus (Tokyo, Japan) iTEM 5.2 (Build 3554) and FEI TIA 4.1.202 software package. Preferably, the local chemical composition (in particular the local aluminium concentration in wt %) is determined at equally spaced spots (each spot having its neighbouring spots at a distance of e.g. 40 nm or 20 nm) distributed over the aluminium-doped iron oxide layer, and the (average) aluminium concentration of the aluminium-doped iron oxide layer is then determined from these local aluminium concentration values.

Preferably, the Al-doped iron oxide layer contains from 0.05 wt % to 10 wt % Al or from 0.1 wt % to 10 wt % Al, more preferably from 0.5 wt % to 10 wt % Al, even more preferably 0.5 wt % to 8 wt % Al, or from 0.5 wt % to 6 wt % Al, based on the total amount of Fe and Al atoms in the Al-doped iron oxide layer.

Like any layer, the Al-doped iron oxide layer of the effect pigment of the present invention has a lower surface and an upper surface. The lower surface is in contact with the substrate, and the upper surface is opposite to the lower surface. Furthermore, the aluminium-doped iron oxide layer has a substrate-near part including the lower surface and a substrate-remote part including the upper surface.

In the present invention, it is preferred that the Al concentration in the substrate-near part of the Al-doped iron oxide layer is higher than the Al concentration in the substrate-remote part of the Al-doped iron oxide layer. In a preferred embodiment, the substrate-near part has an Al concentration C1 (expressed in wt %, based on the amount of Fe and Al atoms in the substrate-near part) and the substrate-remote part has an Al concentration C2 (expressed in wt %, based on the amount of Fe and Al atoms in the substrate-remote part), and $C1 \geq 1.25 \times C2$; more preferably C1≥1.5×C2. The substrate-near and substrate-remote parts can each have a thickness of e.g. 120 nm (i.e. covering the part of the Al-doped iron oxide layer extending 120 nm from the lower surface (substrate-near) or the upper surface (substrate-remote)) or 80 nm or 40 nm.

The aluminium concentrations in the substrate-near and substrate-remote parts are determined via TEM in combination with EDXS, as described above.

Preferably, the aluminium-doped iron-oxide coating layer covers at least 50%, more preferably at least 75% or at least 90% of the surface of the aluminium-based substrate, or may even completely cover the surface of the aluminium-based substrate. Surface coverage of the substrate by the aluminium-doped iron oxide layer can be determined by transmission electron microscopy.

The term "iron oxide" refers to fully condensed iron oxides but also to iron oxides still containing hydroxyl groups (i.e. "hydroxyl-containing iron oxide").

The term "hydroxyl-containing iron oxide" indicates that the iron oxide still contains hydroxyl groups due to incomplete condensation during the formation of the iron oxide, and/or the iron oxide still contains water. The hydroxyl groups can be distributed over the entire iron oxide, or can be present in some areas of the iron oxide only while the other areas, due to complete condensation, do not contain hydroxyl groups anymore. If not specifically indicated, the term "iron oxide" encompasses any stoichiometric ratio between iron and oxygen that may exist in commonly known iron oxides.

The iron oxide can preferably be represented by one of the following formulas:

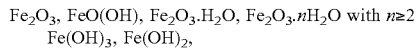

$Fe_2O_3$, $FeO(OH)$, $Fe_2O_3 \cdot H_2O$, $Fe_2O_3 \cdot nH_2O$ with $n \geq 2$
$Fe(OH)_3$, $Fe(OH)_2$, or can be a mixture of two or more of these hydroxyl-containing iron oxides.

The aluminium-doped iron oxide layer can have a thickness which results in a colour according to 1st order or 2nd order interference series.

If the layer thickness of the Al-doped iron oxide layer is within a range which results in 1st order interference colours, these colours can be pale yellow, green-gold, gold, reddish-gold, red, violet, or grayish-violet. If the layer thickness of the hydroxyl-containing iron oxide coating is within a range which results in 2nd order interference colours, these colours can be yellow, gold, reddish-gold, red-gold, or red.

In the present invention, it is possible that the Al-doped iron oxide layer represents the outermost coating layer of the effect pigment. Alternatively, one or more additional coating layers are applied onto the aluminium-doped iron oxide layer.

If present, the one or more additional coating layers can be selected from an inorganic oxide layer such as $SiO_2$, $TiO_2$, a polymer layer, an organosilane coating layer, or any combination thereof.

In a preferred embodiment, the effect pigment contains a final coating layer which is selected from a polymer layer, an organosilane coating layer, or combinations thereof. The term "final coating layer" is synonymous to the "outermost coating layer". With such a final coating layer, surface polarity of the effect pigment can be adjusted, which in turn may improve dispersibility in a specific medium to which the effect pigment shall be added, or may improve bonding of the effect pigment to a binder system.

According to a further aspect, the present invention provides a composition comprising the coloured effect pigment described above.

Preferably, the composition contains a high weight organic material (e.g. a polymer) in which the coloured effect pigment is preferably dispersed.

The high molecular weight organic material can be of natural or synthetic origin. High molecular weight organic materials usually have a molecular weights of at least 103 g/mol. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA. From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones. The said high molecular weight compounds may be present singly or in mixtures, in the form of plastic masses or melts. They may also be present in the form of their monomers or in the polymerised state, in dissolved form as film-formers or binders for coatings or printing inks, such as, for example, boiled linseed oil, nitrocellulose, alkyd resins, melamine resins and urea-formaldehyde resins or acrylic resins.

Depending on the intended use, the amount of the coloured effect pigment in the composition may vary over a broad range, e.g. from 0.01 to 80 wt %, more preferably from 0.1 to 30 wt %, based on the high molecular weight organic material.

The composition comprising the coloured effect pigment can be e.g. a coating composition such as a lacquer composition or a painting composition, The composition may also be a cosmetic composition.

According to a further aspect, the present invention provides a process for preparing a coloured effect pigment, comprising (a) providing a substrate made of aluminium or an aluminium alloy which is optionally coated with one or more passivation layers, (b) coating the substrate in a liquid coating medium with an aluminium-doped iron oxide layer, wherein the liquid coating medium comprises an iron oxide precursor compound and an aluminium compound.

With regard to the substrate and its preparation, reference can be made to the statements made above when describing the coloured effect pigment.

Preferably, the coloured effect pigment obtained or obtainable by the process of the present invention corresponds to the coloured effect pigment already described above.

As indicated above, the substrate is coated in a liquid coating medium, which comprises an iron oxide precursor compound and an aluminium compound, with an aluminium-doped iron oxide layer.

Preferably, the liquid coating medium is an aqueous coating medium. Typically, the aqueous coating medium contains water in an amount of from 10 wt % to 100 wt %, or from 30 wt % to 100 wt %, or from 50 wt % to 100 wt %, or from 60 wt % to 100 wt %, based on the total amount of liquids in the aqueous coating medium.

Aluminium compounds which can be used in a coating process in a liquid, preferably aqueous coating medium, are known to the skilled person. Exemplary aluminium compounds are e.g. aluminium salts such as aluminium sulphate, aluminium halides, aluminium nitrate, aluminium phosphate, hydrolysable aluminium compounds such as aluminium alkoxides (e.g. aluminium isopropoxide), complex compounds of aluminium such as aluminium acetylacetone, or combinations or mixtures thereof.

Iron oxide precursor compounds which can be used for providing an iron oxide coating via a wet chemical process are generally known to the skilled person. Exemplary iron oxide precursor compounds are e.g. iron salts such as iron(III) halides (e.g. Fe(III) chloride), iron(III) nitrate, iron(III) sulfate, hydrolysable iron compounds such as iron alkoxides, complex compounds of iron such as iron acetylacetone, or any combination or mixture thereof.

The aluminium compound and the iron oxide precursor compound can be added to the liquid coating medium in any sequence. Just as an example, the aluminium compound can be at least partly dissolved in the liquid coating medium, followed by adding an iron oxide precursor compound. Alternatively, it is possible to add the aluminium compound and the iron oxide precursor compound simultaneously, or to add the iron oxide precursor compound first and then the aluminium compound.

As indicated above, an aluminium-doped iron oxide layer is applied on the substrate. This can be accomplished by bringing the liquid coating medium to iron oxide forming conditions. Appropriate conditions for initiating the formation of iron oxide in a wet chemical process are generally known to the skilled person and are described e.g. in DE 198 36 810 A1, EP 0 708 154, EP 0 668 329 and EP 1 553 144.

In principle, the aluminium-doped iron oxide layer can be applied onto the substrate at acidic or alkaline pH. Preferably, when applying the aluminium-doped iron oxide layer on the substrate, the liquid coating medium has a pH of 5 or less, more preferably of from 4 to 2. Preferably, pH of the aqueous coating medium is kept constant while applying the aluminium-doped iron oxide layer on the substrate.

While applying the aluminium-doped iron oxide layer on the substrate, temperature of the liquid coating medium can be varied over a broad range, such as at least 20° C., e.g. 20° C. to 100° C. or 30 to 100° C.

Accordingly, preferred iron oxide forming conditions include a pH of the liquid coating medium of 5 or less and/or a temperature of the liquid coating medium of at least 20° C.

In a preferred embodiment, the aluminium compound is at least partly dissolved in the liquid coating medium, followed by adjusting pH and/or temperature of the liquid coating medium to iron oxide forming conditions and then adding the iron oxide precursor compound. Alternatively, in another preferred embodiment, pH and/or temperature of the liquid coating medium is/are adjusted to iron oxide forming conditions, followed by adding the aluminium compound and the iron oxide precursor compound, either simultaneously or the aluminium compound first and subsequently the iron oxide precursor compound. The iron oxide precursor compound can be added to the liquid coating medium either continuously or stepwise or at once. Preferably, the iron oxide precursor compound is added continuously.

Typically, the iron oxide precursor compound is continuously fed to the liquid coating medium until the predetermined colour of the effect pigment is obtained.

The aluminium compound can be added continuously, stepwise or at once.

Preferably, the coloured effect pigment obtained in step (b) is subsequently subjected to a thermal treatment step, e.g. for drying the pigment and/or effecting further condensation in the Al-doped iron oxide layer. Due to the presence of Al in the iron oxide, the thermal treatment step can be carried out under quite mild conditions, e.g. at a temperature of less than 450° C. or less than 400° C. or even less than 300° C., while still enabling the formation of a non-magnetic effect pigment.

Preferably, the aluminium or aluminium alloy of the substrate is coated with a passivating layer. Appropriate passivating layers are generally known to the skilled person. The passivating layer is preferably an inorganic layer such as a metal phosphate layer, or an inorganic oxide layer. If the inorganic passivating layer is a metal phosphate layer, the metal can be selected from Ti, V, Cr, Mn, Fe, Co, Ni, Cu, Zn, Al, Zr, Nb, Mo, Ta or W. If the inorganic passivating layer is an inorganic oxide layer, the oxide can be selected from Ti, V, Cr, Mn, Fe, Co, Ni, Cu, Zn, Al, Zr, Nb, Mo, Ta, W, Ge, Si, Sn and Bi oxides or any combinations thereof. If one or more passivating layers are present, it is preferred that that the outermost passivating layer is not an aluminium oxide layer, an aluminium hydroxide layer, an aluminium oxide hydroxide layer, or any combination thereof. In a preferred embodiment, the outermost passivating layer is $SiO_2$ or $TiO_2$ or a combination or mixture thereof.

In principle, a passivating layer can be produced by a wet-chemical method or a chemical vapour deposition (CVD) method. Methods for preparing a passivating layer on an effect pigment substrate such as aluminium platelets are generally known to the skilled person. In the wet-chemical process, appropriate precursor compounds such as organic silicon and/or aluminium compounds in which the organic groups are bonded to the metals via oxygen atoms are hydrolyzed in the presence of the substrate particles (e.g. aluminium flakes or platelets) and of an organic solvent in which the metal compounds are soluble. Preferably, a metal alkoxide (especially tetraethoxysilane and aluminium triisopropoxide) is hydrolyzed in the presence of an alcohol (e.g. ethanol or isopropanol) and a basic or acid catalyst (e.g. aqueous ammonia and/or amines). This is preferably done by initially charging substrate particles, isopropanol, water and ammonia, heating this mixture to from 40° C. to 80° C., with stirring and continuously adding a solution of the metal alkoxide in isopropanol. Following a subsequent stirring time of usually from 1 to 15 h, the mixture is cooled down to room temperature, and the coated pigment is isolated by filtering off, washing and optionally drying. Further details about the method of preparing a passivating layer on aluminium are provided e.g. in EP 0 708 154 A2 and DE 4405492 A.

As will be discussed below in further detail, the preparation of the passivation layer on the aluminium-based pigment substrate may also include a thermal treatment step in a liquid medium containing one or more high boiling organic liquids.

Preferably, the aluminium or aluminium alloy (preferably in the form of flakes or platelets) of the substrate is not subjected to any wet-chemical oxidation as this may reduce the pronounced flop characteristics and also generates undesired hydrogen gas.

Preferably, the process also includes a surface modification step wherein a surface modifying agent is applied onto the coloured effect pigment. Appropriate compounds for modifying the surface properties of effect pigments are known to the skilled person. Preferably, the surface modifying agent is a polymer or a compound having a functional group which is reactive to the surface of the effect pigment such as an alkoxysilane. Methods for surface modification of effect pigments and appropriate surface modifying agents such as silanes having surface-reactive functional groups (e.g. alkoxysilanes etc.) are known to the skilled person and may improve compatibility of the effect pigment material with the varnish or lacquer. Surface modification methods and agents are described e.g. in EP 1 682 622, EP 1 904 587 and EP 0 688 833.

A metal oxide layer (such as an iron oxide oxide layer) provided on a substrate via a wet-chemical process step may still include a significant number of hydroxyl groups, due to incomplete condensation between the hydrolyzed precursor species and/or the presence of water. The risk of triggering an aluminothermic reaction can be reduced if further condensation of the hydroxyl-containing metal oxide is carried out by thermal treatment in a high boiling solvent.

In a preferred embodiment of the present invention, the aluminium-doped iron oxide layer coated on the substrate in step (b) is a hydroxyl-containing aluminium-doped iron oxide layer of a first coloured effect pigment CEP1; wherein the process further comprises
(c) providing the first coloured effect pigment CEP1 in a liquid post-treatment medium comprising one or more high boiling organic liquids, and
(d) heating the liquid post-treatment medium to a temperature of at least 90° C. so as to convert the first coloured effect pigment CEP1 to a second coloured effect pigment CEP2.

The risk of initiating an aluminothermic reaction while subjecting the effect pigment to a final heat treatment can also be reduced when an inorganic non-metallic solid is added to the liquid coating medium, the inorganic non-metallic solid preferably being selected from sheet or layered silicates or phyllosilicates, aluminium oxides, aluminosilicates, glass, or any combination thereof. The inorganic non-metallic solid which is added to the aqueous coating medium can be non-coated or coated, e.g. with a metal oxide layer such as an iron oxide or a titanium oxide layer.

A preferred phyllosilicate or sheet or layered silicate is mica. Mica is commonly known to the skilled person and commercially available. In the present invention, synthetic mica as well as naturally occurring mica can be used. Exemplary mica materials that can be mentioned include e.g. phlogopite and fluoro phlogopite.

The average particle size of the inorganic non-metallic solid can be varied over a broad range. Preferable, an average particle size of the inorganic non-metallic solid is chosen which is similar to the average particle size of the coloured effect pigment. In a preferred embodiment, the average particle size of the inorganic non-metallic solid and the average particle size of the coloured effect pigment do not differ by more than 30%, more preferably do not differ by more than 15%. In a preferred embodiment, the inorganic non-metallic solid has a plate-like morphology and an aspect ratio which differs by less than 30%, more preferably less than 15% from the aspect ratio of the pigment substrate.

Preferably, the inorganic non-metallic solid is added to the liquid coating medium in an amount of from 1 wt % to 50 wt %, more preferably from 5 wt % to 30 wt %, based on the amount of the coloured effect pigment.

While adding the inorganic non-metallic solid, the liquid coating medium is preferably stirred so as to effectively mix the inorganic non-metallic solid and the coloured effect pigment.

As already mentioned above, the presence of the inorganic non-metallic solid assists in suppressing an aluminothermic reaction, in particular if the pigment-containing material is subjected to a drying step at a later stage.

As indicated above, the process of the present invention may optionally comprise a step (c) of providing the first coloured effect pigment CEP1 (i.e. the substrate having a hydroxyl-containing Al-doped iron oxide coating applied thereon) in a liquid post-treatment medium comprising one or more high boiling organic liquids, and a step (d) of heating the liquid post-treatment medium to a temperature of at least 90° C. so as to convert the first coloured effect pigment CEP1 to a second coloured effect pigment CEP2.

With the term "post-treatment", it is indicated that said treatment is carried out on a pigment substrate which has already been coated with the hydroxyl-containing metal oxide.

The first coloured effect pigment CEP1 can be provided in the liquid post-treatment medium by partially removing the liquid coating medium, thereby obtaining the first coloured effect pigment CEP1 as a wet material, and suspending the wet CEP1 in the liquid post-treatment medium.

The weight ratio of the wet CEP1 (e.g. in the form of a wet filter cake) to the one or more high boiling organic liquids is preferably within the range of from 1/1 to 1/40, or from 1/2 to 1/20.

Preferably, the liquid coating medium is partially removed by filtration. Thus, the first coloured effect pigment CEP1 is obtained in the form of a wet filter cake, which is subsequently suspended in the liquid post-treatment medium.

The wet CEP1 (e.g. in the form of a wet filter cake) can be suspended in the liquid post-treatment medium by means commonly known to the skilled person. The wet CEP1 can be transferred to a vessel containing the liquid post-treatment medium and then suspended therein. Alternatively, the liquid post-treatment medium can be fed to the wet CEP1 and the suspension of the CEP1 in the liquid post-treatment medium may subsequently transferred to another vessel.

Partial removal of the liquid coating medium can also be accomplished by thermal treatment, possibly in combination with a filtration step.

After partial removal of the liquid coating medium (e.g. by filtration and/or evaporation), the wet CEP1 (e.g. in the form of a wet filter cake) should still contain said liquid coating medium in an amount which is sufficient for minimizing the risk of triggering an aluminothermic reaction. Typically, the solids content of the wet CEP1 after partial removal of the liquid coating medium can be within the range of from 10 wt % to 90 wt %, or from 20 wt % to 80 wt %, or from 30 wt % to 70 wt %.

The first coloured effect pigment CEP1 can also be provided in the liquid post-treatment medium by continuously exchanging the liquid coating medium with the liquid post-treatment medium.

The first coloured effect pigment CEP1 can also be provided in the liquid post-treatment medium by using in step (b) a liquid (preferably aqueous) coating medium which already contains one or more high boiling organic liquids, or adding one or more high boiling organic liquids to the liquid coating composition during or after the formation of the first coloured effect pigment CEP1, and subsequently increasing, preferably maximizing, the relative amount of the high boiling organic liquid(s) by thermal treatment, preferably at a temperature of at least 90° C., more preferably at least 100° C., even more preferably at least 120° C. or at least 140° C. Due to this thermal treatment, organic liquids of lower boiling point (if compared to the boiling point(s) of the one or more high boiling liquids) and optionally water are at least partially removed.

As indicated above, the liquid post-treatment medium comprises one or more high boiling organic liquids. Preferably, the high boiling organic liquid has a boiling point of at least 90° C., more preferably at least 100° C., even more preferably at least 120° C. or at least 140° C. In a preferred embodiment, the boiling point of the high boiling organic liquid is within the range of from 90 to 400° C., more preferably from 100 to 350° C., or from 120 to 300° C., or from 140 to 300° C.

Organic liquids having a boiling point within the ranges as described above are known to the skilled person. Preferably, the high boiling organic liquid is selected from alcohols such as monohydroxyl alcohols, diols (e.g. glycols) or polyols, glycol ethers (e.g. diethylene glycol monoethyl ether), polyglycol ethers, polyethylene glycol monoethyl ethers, polypropylene glycols, aldehydes, esters, carbonate esters like propylene carbonate, organic acids, organic acid amides, lactams such as N-methyl pyrrolidone, ketones, ethers, alkanes, halide-substituted alkanes, alkenes, alkynes, aromatic compounds, liquid polymers, or mineral oils, or mixtures thereof.

Preferably, the liquid post-treatment medium contains the one or more high-boiling organic liquids in an amount of at least 70 wt %, more preferably at least 80 wt % or at least 90 wt %, based on the total weight of the liquid components.

As indicated above, the liquid post-treatment medium is heated to a temperature of at least 90° C., more preferably at least 100° C., even more preferably at least 120° C. or even at least 140° C., so as to convert the first coloured effect pigment to a second coloured effect pigment CEP2.

Preferably, the liquid post-treatment medium is heated to a temperature of from 90 to 400° C., more preferably from 100 to 300° C., or from 120 to 300° C., or from 140 to 300° C.

At these temperatures, removal of organic liquids of lower boiling point which might still be present, and water (if a heating temperature of at least 100° C. is used) is possible, thereby continuously increasing the content of the high-boiling organic liquids.

If the liquid post-treatment medium contains one or more organic liquids of lower boiling point, e.g. below 90° C. or below 85° C., and optionally water, it can be preferred to continue heating of the liquid post-treatment medium until the organic liquids of lower boiling point and optionally water are at least partially removed from the liquid post-treatment medium.

In a preferred embodiment, the liquid post-treatment medium is heated at a temperature of at least 90° C., more preferably at least 100° C. or at least 120° C. or even at least 140° C., for at least a time period which is sufficient for maximizing the relative amount of the high boiling organic liquid(s), based on the total amount of liquid components, optionally followed by a continued heat treatment at the temperature indicated above for a time period of at least 0.5 h, more preferably at least 3 h.

These temperatures outlined above are sufficiently high so as to decrease the number of hydroxyl groups in the first coloured effect pigment CEP1, thereby obtaining a second coloured effect pigment CEP2 having a lower content of hydroxyl groups if compared to CEP1, and having improved coloristic stability. Typically, the colour of the second coloured effect pigment CEP2 is different from the colour of the first coloured effect pigment CEP1, i.e. CEP1 and CEP2 have different light absorption properties.

Within the present invention, it is also possible that the liquid (preferably aqueous) coating medium already contains one or more of the high-boiling organic liquids described above and may therefore not only act as a coating medium but also as a liquid post-treatment medium. In this specific embodiment, the liquid coating medium corresponds to the liquid post-treatment medium. According to this preferred embodiment, no specific operations such as filtration and subsequent transfer of the wet filter cake into the liquid post-treatment medium are necessary.

Typically, the heating period of the first coloured effect pigment CEP1 in the liquid post-treatment medium can be at least 0.5 h, more preferably at least 3 h and may e.g. range from 0.5 h to 48 h, more preferably from 3 h to 48 h. If the liquid post-treatment medium in which the first coloured effect pigment is provided contains one or more organic liquids of lower boiling point, e.g. below 90° C. or below 85° C., and optionally water, it can be preferred to remove the organic liquids and optionally water by heating and then continue heating for the heating period specified above.

Conversion of the first coloured effect pigment CEP1 to the second coloured effect pigment CEP2 upon heat treatment in the liquid post-treatment medium can also be detected by optical measurements.

A colour shift can be detected in the course of the heat treatment in the liquid post-treatment medium which results for example from converting $FeO(OH)$ to $Fe_2O_3$.

Preferably, heating of the liquid post-treatment medium is continued until the desired final colour is obtained, or until no colour shift in the coloured effect pigment is detected anymore. In a preferred embodiment, the second coloured effect pigment CEP2 obtained in step (d) does not show a colour shift anymore on further heat treatment in the liquid post-treatment medium.

It can be preferred to continue heating of the liquid post-treatment medium in step (d) until at least 95 wt %, more preferably at least 98 wt % or at least 99 wt % of the hydroxyl-containing Al-doped iron oxide in CEP1 are converted to the corresponding Al-doped iron oxide, i.e. a metal oxide which is fully condensed such as $Fe_2O_3$. On the other hand, it can be preferred to continue heating of the liquid post-treatment medium in step (d) to such an extent that hydroxyl groups are still present on the surface of the second coloured effect pigment CEP2. Via these surface hydroxyl groups, a surface modification step may then be effected later on.

The liquid post-treatment medium containing the second coloured effect pigment CEP2 can be subjected to a filtration step so as to obtain the CEP2 in the form of a wet material (e.g. a wet filter cake). The CEP2 wet filter cake may optionally be subjected to a washing step. Appropriate washing liquids include e.g. polar organic liquids such as C1-4 alcohols (e.g. ethanol, isopropanol). Typically, the CEP2 obtained after the final filtration step is a paste.

The solids content of the wet second coloured effect pigment CEP2 obtained after the final filtration step (e.g. in the form of a paste) can vary over a broad range. Typically, the wet CEP2 has a solids content of from 10 wt % to 80 wt %, or from 15 wt % to 70 wt %.

The final wet CEP2 may still contain one or more of the high boiling organic liquids described above. The amount of the high boiling organic liquid(s) in the final wet CEP2 depends on whether a washing step has been carried out after the final filtration step.

Accordingly, the liquid component of the wet CEP2 may contain the high boiling organic liquid in an amount of 100 wt % (i.e. no other liquids being present in the wet CEP2) to 0.5 wt %, or from 50 to 0.5 wt %, or from 10 wt % to 0.5 wt %.

As mentioned above, if the liquid post-treatment medium contains one or more organic liquids of lower boiling point, e.g. below 90° C. or below 85° C., and optionally water, it can be preferred to continue heating of the liquid post-treatment medium until the organic liquids of lower boiling point and optionally water are at least partially removed from the liquid post-treatment medium.

Accordingly, it is possible to finally obtain a wet CEP2 which has a very low water-content or is even free of water. This may later-on improve dispersion of the wet CEP2 in organic-based coatings. Preferably, the wet CEP2 obtained from the process of the present invention has a water content of less than 10 wt %, more preferably less than 5 wt % or even less than 2 wt %, based on the total weight of the wet CEP2. The wet CEP2 obtained from the process of the present invention may even be free of water. The water content is determined via Karl-Fischer titration.

Optionally, the process of the present invention may also comprise a step (e) wherein the second coloured effect pigment CEP2 is subjected to a surface modification step, e.g. with a surface-modifying agent having a functional group which is reactive to the surface of the CEP2.

Methods for surface modification of effect pigments and appropriate surface modifying agents such as silanes having surface-reactive functional groups (e.g. alkoxysilanes etc.) are known to the skilled person and may improve compatibility of the effect pigment material with the varnish or lacquer. Surface modification methods and agents are described e.g. in EP 1 682 622, EP 1 904 587 and EP 0 688 833.

In a preferred embodiment, surface modification step (e) is carried out in the liquid post-treatment medium, e.g. during and/or subsequent to the heat treatment step (d).

Due to the presence of one or more of the high boiling organic liquids, the surface modification step can be carried out at higher temperature, preferably at least 100° C., more preferably at least 120° C. or at least 140° C. (e.g. 100° C. to 300° C. or 120° C. to 300° C. or 140° C. to 300° C.), which in turn improves covalent attachment of the surface modifying agents to the pigment surface.

As mentioned above, it is preferred that the substrate on which the aluminium-doped iron oxide layer is applied is made of aluminium or aluminium alloy, preferably in the form of flakes or platelets, which comprises at least one passivation layer on its surface.

In a preferred embodiment of the present invention, the process comprises a passivation step which is carried out prior to step (b), wherein
- at least one passivation layer is applied onto the aluminium or aluminium alloy in a liquid passivation medium, thereby obtaining a passivated substrate,
- the passivated substrate is provided in a liquid pre-treatment medium comprising at least one high-boiling organic liquid, and
- the liquid pre-treatment medium is heated to a temperature of at least 90° C. so as to obtain a pre-treated passivated substrate.

With the term "pre-treatment", it is indicated that said treatment is carried out on a pigment substrate which has not yet been coated with the Al-doped iron oxide layer.

Preferably, thermal treatment of the passivated substrate is carried out at a temperature of at least 100° C., more preferably at least 120° C. or at least 140° C.

With regard to appropriate high-boiling organic liquids, reference can be made to those used for the liquid post-treatment medium in steps (c) and (d). Preferably, the high boiling organic liquid is selected from alcohols such as monohydroxyl alcohols, diols (e.g. glycols) or polyols, glycol ethers (e.g. diethylene glycol monoethyl ether), polyglycol ethers, polyethylene glycol monoethyl ethers, polypropylene glycols, aldehydes, esters, carbonate esters like propylene carbonate, organic acids, organic acid amides, lactams such as N-methyl pyrrolidone, ketones, ethers, alkanes, halide-substituted alkanes, alkenes, alkynes, aromatic compounds, liquid polymers, or mineral oils, or mixtures thereof. Preferably, the high boiling organic liquid has a boiling point of at least 90° C., more preferably at least 100° C., even more preferably at least 120° C. or at least 140° C. In a preferred embodiment, the boiling point of the high boiling organic liquid is within the range of from 90 to 400° C., more preferably from 90 to 300° C., or from 100 to 300° C., or from 120 to 300° C., or from 140 to 300° C.

As mentioned above, methods for preparing a passivating layer on an effect pigment substrate such as aluminium platelets are generally known to the skilled person.

As also discussed above, appropriate passivating layers are generally known to the skilled person. In the present invention, the passivating layer is preferably an inorganic layer such as a metal phosphate layer, and/or an inorganic oxide layer.

The liquid passivation medium preferably contains water in an amount which is sufficient for effecting hydrolysis of appropriate precursor compounds and subsequent condensation of the hydrolyzed precursor species. Preferably, in addition to water, the liquid passivation medium contains an organic liquid such as ethanol and/or iso-propanol which can act as a solvent for the precursor compound to be hydrolyzed. Typically, these organic liquids have a boiling point below 85° C. or even below 80° C.

In the passivation step, a passivated substrate is prepared in the liquid passivation medium and then provided in the liquid pre-treatment medium. Preferably, the passivation step does not include any drying step, in particular thermal drying step, which results in a dry or substantially dry passivated substrate, or a dry or substantially dry pre-treated passivated substrate. Preferably, there is also no such drying step in between the passivation step and step (b). "Substantially dry" preferably means that the liquid content would be less than 5 wt % or even less than 2 wt %.

The passivated substrate can be provided in the liquid pre-treatment medium by partially removing the liquid passivation medium, thereby obtaining the passivated substrate as a wet material, and suspending the wet passivated substrate material in the liquid pre-treatment medium.

Preferably, the liquid pre-treatment medium contains the one or more high-boiling organic liquids in an amount of at least 50 wt %, more preferably at least 60 wt % or at least 70 wt %, or at least 80 wt %.

The weight ratio of the wet passivated substrate material (e.g. in the form of a wet filter cake) to the one or more high boiling organic liquids is preferably within the range of from 1/1 to 1/40, more preferably 1/2 to 1/20.

In a preferred embodiment, the liquid passivation medium is partially removed by filtration. Thus, the passivated substrate is obtained in the form of a wet filter cake, which is subsequently suspended in the liquid pre-treatment medium.

The wet passivated substrate material (e.g. in the form of a wet filter cake) can be suspended in the liquid pre-treatment medium by means commonly known to the skilled person. The wet substrate material can be transferred to a vessel containing the liquid pre-treatment liquid and then suspended therein. Alternatively, the liquid pre-treatment medium can be fed to the wet substrate material and the suspension of the passivated substrate in the liquid pre-treatment medium may subsequently be transferred to another vessel.

Partial removal of the liquid passivation medium can also be accomplished by thermal treatment, possibly in combination with a filtration step.

Typically, the solids content of the wet passivated substrate material after partial removal of the liquid passivation medium can be within the range of from 10 wt % to 90 wt %, or from 20 wt % to 80 wt %, or from 30 wt % to 70 wt %.

The passivated substrate can also be provided in the liquid pre-treatment medium by continuously exchanging the liquid passivation medium with the liquid pre-treatment medium.

The passivated substrate can also be provided in the liquid pre-treatment medium by using a liquid passivation medium which already contains one or more high boiling organic liquids, e.g. in an amount of 50 wt % or more, and/or adding one or more high boiling organic liquids to the liquid passivation medium during or after the formation of the passivated substrate, and subsequently increasing, preferably maximizing, the relative amount of the high boiling organic liquid(s) by thermal treatment, preferably at a temperature of at least 90° C., more preferably at least 100° C., even more preferably at least 120° C. or at least 140° C. Due to this thermal treatment, organic liquids of lower boiling point (if compared to the boiling point(s) of the one or more high boiling liquids) and optionally water are at least partially removed.

As indicated above, the liquid pre-treatment medium is heated to a temperature of at least 90° C., more preferably at least 100° C., even more preferably at least 120° C. or at least 140° C.

At these temperatures, removal of organic liquids of lower boiling point which might still be present, and water (if a heating temperature of at least 100° C. is used) is possible, thereby continuously increasing the content of the high-boiling organic liquids.

Furthermore, these temperatures are sufficiently high so as to initiate further condensation reactions between neighbouring hydroxyl groups.

Within the present invention, it is also possible that the liquid passivation medium already contains one or more of the high-boiling organic liquids described above and may therefore not only act as a passivation medium but also as a liquid pre-treatment medium. In this specific embodiment, the liquid passivation medium corresponds to the liquid pre-treatment medium. According to this preferred embodiment, no specific operations such as filtration and subsequent transfer of the wet filter cake into the liquid pre-treatment medium are necessary.

The pre-treated passivated substrate can be transferred from the liquid pre-treatment medium of the passivation step to the liquid coating medium of step (b) by commonly known means.

The pre-treated passivated substrate can be provided in the liquid coating medium by partially removing the liquid pre-treatment medium, thereby obtaining the pre-treated passivated substrate as a wet material, and suspending the wet pre-treated passivated substrate material in the liquid coating medium.

In a preferred embodiment, the liquid pre-treatment medium is partially removed by filtration. Thus, the pre-treated passivated substrate is obtained in the form of a wet filter cake, which is subsequently suspended in the liquid coating medium.

The wet pre-treated passivated substrate material (e.g. in the form of a wet filter cake) can be suspended in the liquid coating medium by means commonly known to the skilled person. The wet substrate material can be transferred to a vessel containing the liquid coating medium and then suspended therein. Alternatively, the liquid coating medium can be fed to the wet substrate material and the suspension of the pre-treated passivated substrate in the liquid coating medium may subsequently be transferred to another vessel.

Partial removal of the liquid pre-treatment medium can also be accomplished by thermal treatment, possibly in combination with a filtration step.

Typically, the solids content of the wet pre-treated passivated substrate material after partial removal of the liquid pre-treatment medium can be within the range of from 10 wt % to 90 wt %, or from 20 wt % to 80 wt %, or from 30 wt % to 70 wt %.

The pre-treated passivated substrate can also be provided in the aqueous coating medium by continuously exchanging the liquid pre-treatment medium with the aqueous coating medium.

BRIEF DESCRIPTION OF THE DRAWINGS

FIG. 3 shows a TEM picture including an elemental analysis (EDXS) from different area of the Al-doped iron oxide layer. Elemental analysis confirmed that the iron oxide layer was doped with Al in an amount of less than 10 mol%. The Al concentration in the substrate near part (weight ratio Fe/Al=98:2, i.e. 2 wt% Al based on amount of (Fe+Al)) was higher than in the substrate remote part (weight ratio Fe/Al=99:1, i.e. 1 wt% Al based on (Fe+Al)). The right side of the image is the substrate side. Key: 1=lacquer; 6=Fe:Al (~98:2). 7=Fe:Al (~99:1).

The present invention will now be described in further detail by the following Examples.

EXAMPLES

Example 1

Liquid Coating Medium to which no Al Compound is Added

Following the passivation method described in Example 1 (step a)) of EP 0 708 154, a $SiO_2$ passivation layer was applied on an aluminium substrate.

100 g of the passivated aluminium (provided as a paste) with an Al to $SiO_2$ weight ratio of about 66:33 was suspended in 800 ml water. The suspension was heated to 77° C. Then, pH was adjusted with $HNO_3$ to about 3 and dosing of a $Fe(NO_3)_3$ solution (50 w/w) at 60 ml/h was started. Simultaneously, NaOH was added so as to keep pH at around 3. The dosing was stopped when the desired colour had been achieved. The resulting product was cooled down, filtered off and washed with water. Subsequently, the product was treated in air at 300° C. for 20 minutes.

A paint film containing the effect pigment of Example 1 (i.e. no Al compound being present in the liquid coating medium) was prepared and a magnet was positioned parallel to the surface of the paint film while solidifying the paint film.

Figure 1A:
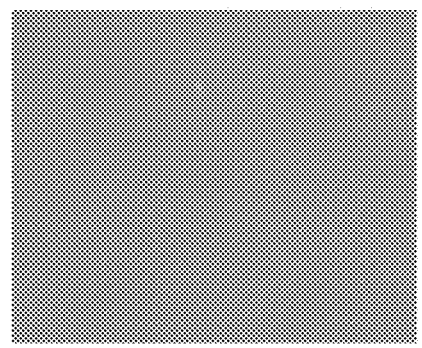
FIG. 1A shows the surface of the solidified paint film (see Example 2; 1% AlOOH). As the effect pigment prepared in Example 2 was non-magnetic, the surface of the paint film remains smooth.
Figure 1B:
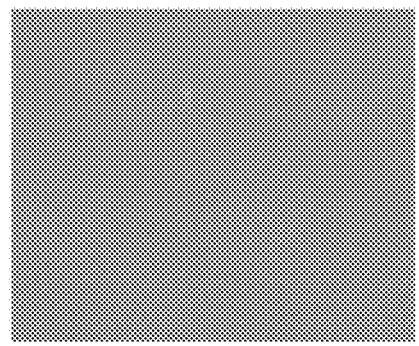
FIG. 1B shows the surface of the solidified paint film (see Example 3; 0.5% AlOOH). As the effect pigment prepared in Example 2 was non-magnetic, the surface of the paint film remains smooth. There is no deformation pattern.
Figure 1C:
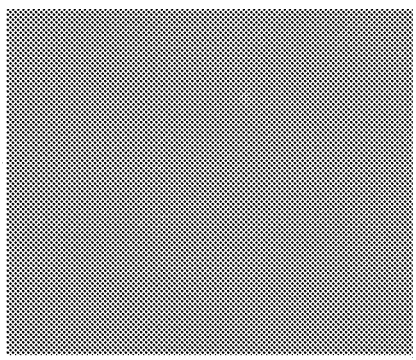
FIG. 1C shows the surface of the solidified paint film (see Example 4; 0.25% AlOOH). As the effect pigment prepared in Example 2 was non-magnetic, the surface of the paint film remains smooth. There is no deformation pattern.
Figure 1D:
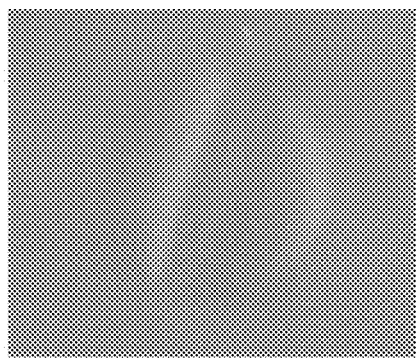
FIG. 1D shows the surface of the solidified paint film (see Example 1; 0% AlOOH). As the effect pigment prepared in Example 1 was magnetic, the surface of the paint film shows a deformation pattern.

FIG. 1d shows the surface of the solidified paint film. As the effect pigment prepared in Example 1 was magnetic, the surface of the paint film shows a deformation pattern.

Example 2

Liquid Coating Medium to which an Al Compound is Added (1 wt % AlOOH Based on Al/$SiO_2$)

Following the passivation method described in Example 1 (step a)) of EP 0 708 154, a $SiO_2$ passivation layer was applied on an aluminium substrate.

100 g of the passivated aluminium (provided as a paste) with an Al to $SiO_2$ weight ratio of about 66:33 was suspended in 800 ml water. The suspension was heated to 77° C. Then, pH was adjusted with $HNO_3$ to about 3, followed by adding 4.95 g $Al_2(SO_4)_3$*12 $H_2O$. Subsequently, dosing of a $Fe(NO_3)_3$ solution (50 w/w) at 60 ml/h was started. Simultaneously, NaOH was added so as to keep pH at around 3. The dosing was stopped when the desired colour had been achieved. The resulting product was cooled down, filtered off and washed with water. Subsequently, the product was treated in air at 300° C. for 20 minutes.

A paint film containing the effect pigment of Example 2 (i.e. Al compound being present in the liquid coating medium) was prepared and a magnet was positioned parallel to the surface of the paint film while solidifying the paint film.

FIG. 1a shows the surface of the solidified paint film. As the effect pigment prepared in Example 2 was non-magnetic, the surface of the paint film remains smooth. There is no deformation pattern.

Elemental analysis (TEM/EDXS) of the effect pigment prepared in Example 2 confirmed that the iron oxide layer was doped with Al in an amount of less than 10 wt %. The Al concentration in the substrate near part (weight ratio Fe/Al=97/3, i.e. 3 wt % Al based on amount of (Fe+Al)) was higher than in the substrate remote part (weight ratio Fe/Al=98/2, i.e. 2 wt % Al based on amount of (Fe+Al)).

Example 3

Liquid Coating Medium to which an Al Compound is Added (0.5 wt % AlOOH Based on Al/$SiO_2$)

Following the passivation method described in Example 1 (step a)) of EP 0 708 154, a $SiO_2$ passivation layer was applied on an aluminium substrate.

100 g of the passivated aluminium (provided as a paste) with an Al to $SiO_2$ weight ratio of about 66:33 was suspended in 800 ml water. The suspension was heated to 77° C. Then, pH was adjusted with $HNO_3$ to about 3, followed by adding 2.48 g $Al_2(SO_4)_3$*12 $H_2O$. Subsequently, dosing of a $Fe(NO_3)_3$ solution (50 w/w) at 60 ml/h was started. Simultaneously, NaOH was added so as to keep pH at around 3. The dosing was stopped when the desired colour had been achieved. The resulting product was cooled down, filtered off and washed with water. Subsequently, the product was treated in air at 300° C. for 20 minutes.

FIG. 1b shows the surface of the solidified paint film. As the effect pigment prepared in Example 2 was non-magnetic, the surface of the paint film remains smooth. There is no deformation pattern.

Figure 2:
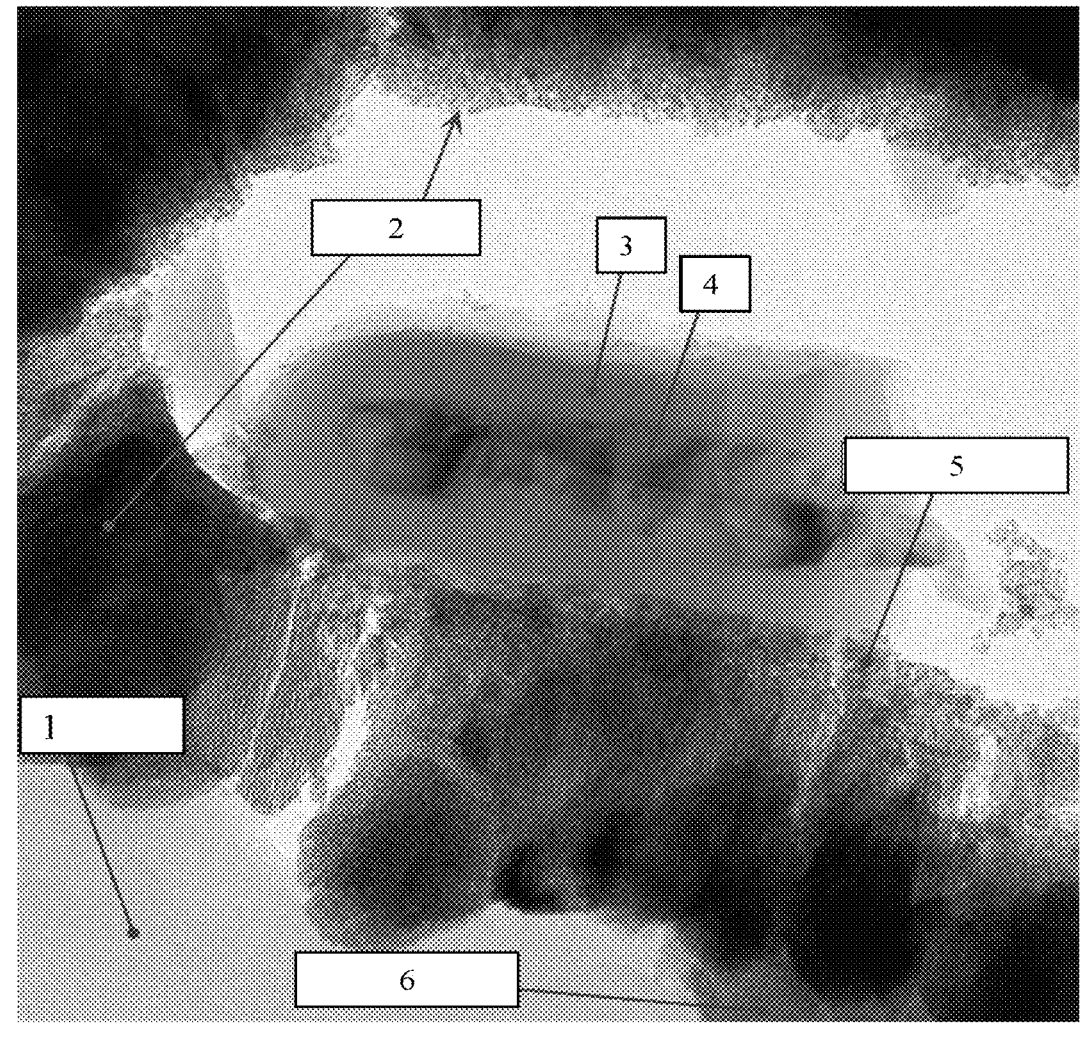
FIG. 2 shows a TEM picture including an elemental analysis (EDXS) from different areas of the Al-doped iron oxide layer. Elemental analysis confirmed that the iron oxide layer was doped with Al in an amount of less than 10 mol%. The Al concentration in the substrate near part (weight ratio Fe/Al=96/4, i.e. 4 wt% Al based on amount of (Fe+Al)) was higher than in the substrate remote part (weight ratio Fe/Al=98/2, i.e. 2 wt% Al based on amount of (Fe+Al)). Key: 1=lacquer; 2=Fe+(Al); 3=Si; 4=Al; 5=Fe:Al (~96:4); 6=Fe:Al (~98:2).

FIG. 2 shows a TEM picture including an elemental analysis (EDXS) from different areas of the Al-doped iron oxide layer. Elemental analysis confirmed that the iron oxide layer was doped with Al in an amount of less than 10 mol %. The Al concentration in the substrate near part (weight ratio Fe/Al=96/4, i.e. 4 wt % Al based on amount of (Fe+Al)) was higher than in the substrate remote part (weight ratio Fe/Al=98/2, i.e. 2 wt % Al based on amount of (Fe+Al)).

Example 4

Liquid Coating Medium to which an Al Compound is Added (0.25 wt % AlOOH Based on Al/$SiO_2$)

Following the passivation method described in Example 1 (step a)) of EP 0 708 154, a $SiO_2$ passivation layer was applied on an aluminium substrate.

100 g of the passivated aluminium (provided as a paste) with an Al to $SiO_2$ weight ratio of about 66:33 was suspended in 800 ml water. The suspension was heated to 77° C. Then, pH was adjusted with $HNO_3$ to about 3, followed by adding 1.24 g $Al_2(SO_4)_3$*12 $H_2O$. Subsequently, dosing of a $Fe(NO_3)_3$ solution (50 w/w) at 60 ml/h was started. Simultaneously, NaOH was added so as to keep pH at around 3. The dosing was stopped when the desired colour had been achieved. The resulting product was cooled down, filtered off and washed with water. Subsequently, the product was treated in air at 300° C. for 20 minutes.

FIG. 1c shows the surface of the solidified paint film. As the effect pigment prepared in Example 2 was non-magnetic, the surface of the paint film remains smooth. There is no deformation pattern.

Figure 3:
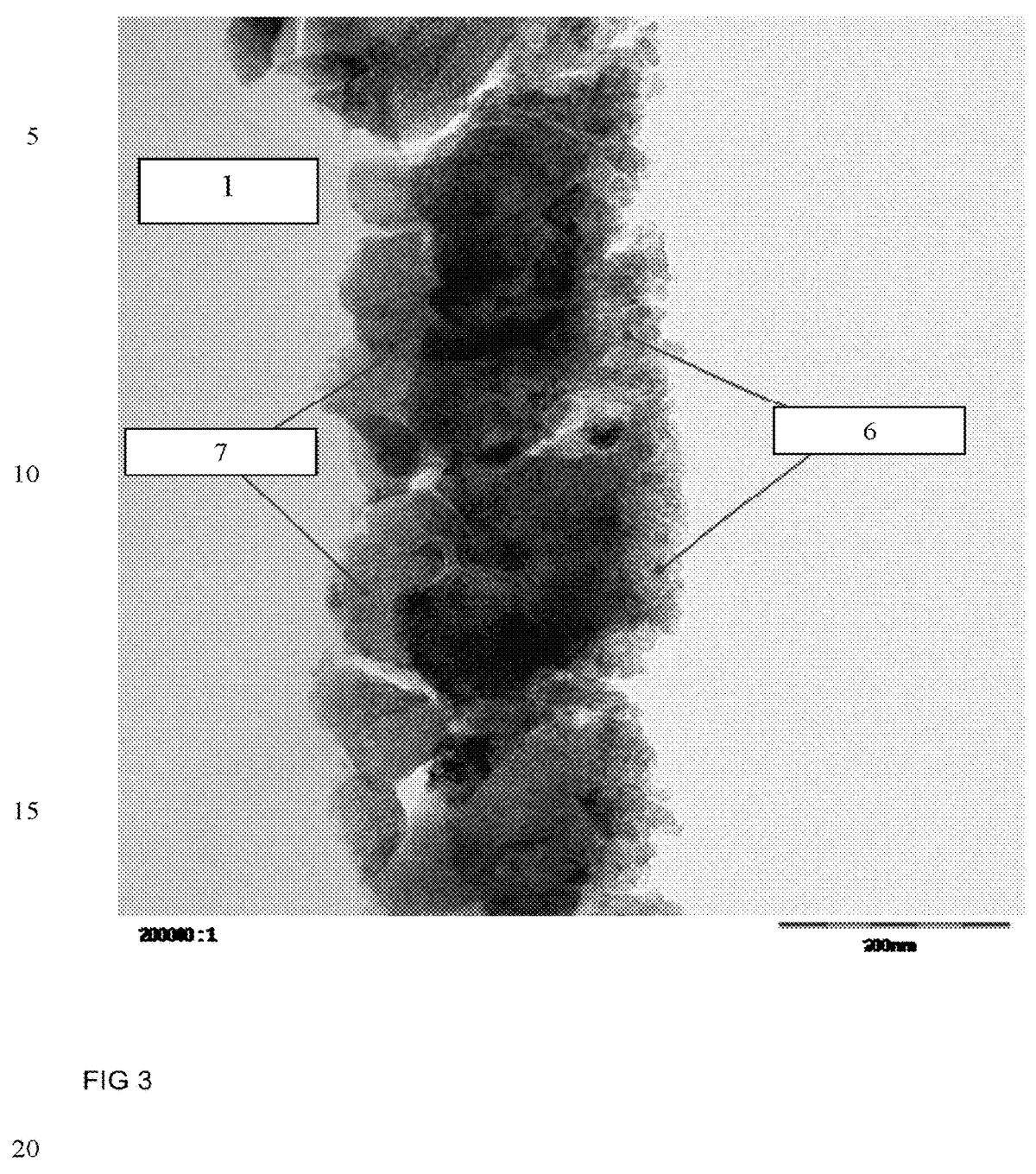

FIG. 3 shows a TEM picture including an elemental analysis (EDXS) from different area of the Al-doped iron oxide layer. Elemental analysis confirmed that the iron oxide layer was doped with Al in an amount of less than 10 mol %. The Al concentration in the substrate near part (weight ratio Fe/Al=98:2, i.e. 2 wt % Al based on amount of (Fe+Al)) was higher than in the substrate remote part (weight ratio Fe/Al=99:1, i.e. 1 wt % Al based on (Fe+Al)).

Example 5

Liquid Coating Medium Containing an Al Compound (0.25 wt % AlOOH Based on Al/SiO$_2$) Followed by Heat Treatment in High Boiling Organic Solvent Following the passivation method described in Example 1 (step a)) of EP 0 708 154, a SiO$_2$ passivation layer was applied on an aluminium substrate.

100 g of the passivated aluminium (provided as a paste) with an Al to SiO$_2$ weight ratio of about 66:33 was suspended in 800 ml water. The suspension was heated to 77° C. Then, pH was adjusted with HNO$_3$ to about 3, followed by adding 1.24 g Al$_2$(SO$_4$)$_3$*12 H$_2$O. Subsequently, dosing of a Fe(NO$_3$)$_3$ solution (50 w/w) at 60 ml/h was started. Simultaneously, NaOH was added so as to keep pH at around 3. The dosing was stopped when the desired colour had been achieved. The resulting product was cooled down, filtered off and washed with water and subsequently with Isopropanol. 100 g of the wet filter cake were suspended in 900 ml of an isoparaffinic mixture (b.p.: 270° C.) as a high boiling solvent. The temperature was increased to about 235° C. and maintained there until desired color was achieved.

The suspension was cooled down to RT.

The final product showed high brilliant color travels without any magnetism. Further the humidity resistant properties were increased.

Example 6

Liquid Coating Medium Containing an Al Compound (0.25 wt % AlOOH Based on Al/SiO$_2$) Followed by Heat Treatment in High Boiling Organic Solvent Following the passivation method described in Example 1 (step a)) of EP 0 708 154, a SiO$_2$ passivation layer was applied on an aluminium substrate.

100 g of the passivated aluminium (provided as a paste) with an Al to SiO$_2$ weight ratio of about 66:33 was suspended in 800 ml water. The suspension was heated to 77° C. Then, pH was adjusted with HNO$_3$ to about 3, followed by adding 1.24 g Al$_2$(SO$_4$)$_3$*12 H$_2$O. Subsequently, dosing of a Fe(NO$_3$)$_3$ solution (50 w/w) at 60 ml/h was started. Simultaneously, NaOH was added so as to keep pH at around 3. The dosing was stopped when the desired colour had been achieved. The resulting product was cooled down, filtered off and washed with water and subsequently with Isopropanol. 100 g of the wet filter cake were suspended in 900 ml methyl polyethylene glycol (molecular weight of about 350 g/mol) as an high boiling solvent. The temperature was increased to about 240° C. and maintained there until desired color was achieved.

The suspension was cooled down to RT.

The final product showed high brilliant color travels without any magnetism. Further the humidity resistant properties were increased.

Example 7

Liquid Coating Medium Containing an Al Compound (0.25 wt % AlOOH Based on Al/SiO$_2$) Followed by Heat Treatment in High Boiling Organic Solvent Following the passivation method described in Example 1 (step a)) of EP 0 708 154, a SiO$_2$ passivation layer was applied on an aluminium substrate.

100 g of the passivated aluminium (provided as a paste) with an Al to SiO$_2$ weight ratio of about 66:33 was suspended in 800 ml water. The suspension was heated to 77° C. Then, pH was adjusted with HNO$_3$ to about 3, followed by adding 1.24 g Al$_2$(SO$_4$)$_3$*12 H$_2$O. Subsequently, dosing of a Fe(NO$_3$)$_3$ solution (50 w/w) at 60 ml/h was started. Simultaneously, NaOH was added so as to keep pH at around 3. The dosing was stopped when the desired colour had been achieved. The resulting product was cooled down, filtered off and washed with water and subsequently with Isopropanol. 100 g of the wet filter cake were suspended in mineral spirits as a high boiling solvent. The temperature was increased to about 235° C. and maintained there until desired color was achieved.

The suspension was cooled down to RT.

The final product showed high brilliant color travels without any magnetism. Further the humidity resistant properties were increased.

Example 8

Liquid Coating Medium Containing an Al Compound (0.25 wt % AlOOH Based on Al/SiO$_2$) Followed by Heat Treatment in Organic Solvent Following the passivation method described in Example 1 (step a)) of EP 0 708 154, a SiO$_2$ passivation layer was applied on an aluminium substrate.

100 g of the passivated aluminium (provided as a paste) with an Al to SiO$_2$ weight ratio of about 66:33 was suspended in 800 ml water. The suspension was heated to 77° C. Then, pH was adjusted with HNO$_3$ to about 3, followed by adding 1.24 g Al$_2$(SO$_4$)$_3$*12 H$_2$O. Subsequently, dosing of a Fe(NO$_3$)$_3$ solution (50 w/w) at 60 ml/h was started. Simultaneously, NaOH was added so as to keep pH at around 3. The dosing was stopped when the desired colour had been achieved. The resulting product was cooled down, filtered off and washed with water and subsequently with Isopropanol. 100 g of the wet filter cake were suspended in an aromatic liquid (b.p.: 242° C.) as a high boiling solvent. The temperature was increased to about 230° C. and maintained there until desired color was achieved.

The suspension was cooled down to RT.

The final product showed high brilliant color travels without any magnetism. Further the humidity resistant properties were increased.

The invention claimed is:

1. A colored effect pigment, comprising
   a substrate comprising aluminum or an aluminum alloy which is optionally coated with one or more passivation layers, and
   an aluminum-doped iron oxide layer,
   wherein no separate Al$_2$O$_3$, Al(OH)$_3$ and/or AlO(OH) phase is present in the aluminum-doped iron oxide layer, and
   wherein the optional one or more passivation layers are made of at least one selected from the group consisting of a metal phosphate, a Ti oxide, a V oxide, a Cr oxide, a Mn oxide, a Co oxide, a Ni oxide, a Cu oxide, a Zn oxide, an Al oxide, a Zr oxide, a Nb oxide, a Mo oxide, a Ta oxide, a W oxide, a Ge oxide, a Si oxide, a Sn oxide, and a Bi oxide.

2. The colored effect pigment according to claim 1, wherein the aluminum-doped iron oxide layer comprises up to 10 wt % Al, based on a total amount of Fe and Al atoms in the aluminum-doped iron oxide layer.

3. The colored effect pigment according to claim 1, wherein the Al concentration in a substrate-near part of the aluminum-doped iron oxide layer is higher than the Al concentration in a substrate-remote part of the aluminum-doped iron oxide layer.

4. The colored effect pigment according to claim 1, further comprising an additional coating layer on the aluminum-doped iron oxide layer.

5. A composition, comprising the colored effect pigment according to claim 1.

6. A process for preparing a colored effect pigment, comprising
coating a substrate comprising aluminum or an aluminum alloy which is optionally coated with one or more passivation layers, in a liquid coating medium with an aluminum-doped iron oxide layer to obtain the colored effect pigment according to claim 1, wherein the liquid coating medium comprises an iron oxide precursor compound and an aluminum compound.

7. The process according to claim 6, wherein the aluminum compound is one or more members selected from the group consisting of an aluminum salt, a hydrolyzable aluminum compound, and a complex compound of aluminum; and/or the iron oxide precursor compound is at least one member selected from the group consisting of an iron salt, a hydrolyzable iron compound, and a complex compound of iron.

8. The process according to claim 6, wherein the aluminum compound is at least partly dissolved in the liquid coating medium, followed by adjusting a pH and/or a temperature of the liquid coating medium to an iron oxide forming condition and then adding the iron oxide precursor compound: or a pH and/or a temperature of the liquid coating medium is/are adjusted to an iron oxide forming condition, followed by adding the aluminum compound and the iron oxide precursor compound, either simultaneously or the aluminum compound first and subsequently the iron oxide precursor compound.

9. The process according to claim 6, wherein the aluminum-doped iron oxide layer is applied on the substrate at a pH of 5 or less.

10. The process according to claim 6, wherein the aluminum-doped iron oxide layer applied on the substrate is a hydroxyl-containing aluminum-doped iron oxide layer of a first colored effect pigment CEP1; and wherein the process further comprises
heating a liquid post-treatment medium comprising the first colored effect pigment CEP1 and an organic liquid having a boiling point of at least 90° C. to a temperature of at least 90° C. so as to convert the first colored effect pigment CEP1 to a second colored effect pigment CEP2.

11. The process according to claim 10, wherein the first colored effect pigment CEP1 is provided in the liquid post-treatment medium by partially removing the liquid coating medium, thereby obtaining the first colored effect pigment CEP1 as a wet material, and suspending the wet CEP1 in the liquid post-treatment medium.

12. The process according to claim 10, wherein the first colored effect pigment CEP1 is provided in the liquid post-treatment medium by using a liquid coating medium which already comprises an organic liquid having a boiling point of at least 90° C., or adding one or more organic liquids each having a boiling point of at least 90° C. to the liquid coating composition during or after the formation of the first colored effect pigment CEP1, and subsequently increasing a relative amount of the organic liquid by a thermal treatment.

13. The process according to claim 6, wherein the aluminum or aluminum alloy of the substrate is not subjected to a wet-chemical oxidation treatment.

14. The colored effect pigment according to claim 4, wherein the additional coating layer is at least one elected from the group consisting of an inorganic oxide layer, an organosilane layer, and a polymer layer.

15. The colored effect pigment according to claim 1, wherein the iron oxide is at least one selected from the group consisting of: $Fe_2O_3$, $FeO(OH)$, $Fe_2O_3 \cdot H_2O$, $Fe_2O_3 \cdot nH_2O$ with $n \geq 2$, $Fe(OH)_3$, and $Fe(OH)_2$, and the iron oxide optionally comprises a hydroxyl group and/or water derived from an incomplete condensation during a formation of the iron oxide.

* * * * *

UNITED STATES PATENT AND TRADEMARK OFFICE
CERTIFICATE OF CORRECTION

PATENT NO. : 10,800,926 B2
APPLICATION NO. : 14/917354
DATED : October 13, 2020
INVENTOR(S) : Wosylus et al.

It is certified that error appears in the above-identified patent and that said Letters Patent is hereby corrected as shown below:

On the Title Page

In Column 1, Item (72), in "Inventors", Line 1, delete "Duerkheim" and insert -- Dürkheim --, therefor.

On Page 2, Column 1, Item (51), under "Int. Cl.", Lines 1-2, delete
"*C23C 26/00*    (2006.01)
*C09C 1/00*     (2006.01)" and insert -- *C23C 26/00*     (2006.01) --, therefor.

In the Drawings

On Sheet 1 of 3, FIG. "1A", delete "FIG 1A" and insert -- FIG. 1A --, therefor.

On Sheet 1 of 3, FIG. "1B", delete "FIG 1B" and insert -- FIG. 1B --, therefor.

On Sheet 1 of 3, FIG. "1C", delete "FIG 1C" and insert -- FIG. 1C --, therefor.

On Sheet 1 of 3, FIG. "1D", delete "FIG 1D" and insert -- FIG. 1D --, therefor.

On Sheet 2 of 3, FIG. "2", delete "FIG 2" and insert -- FIG. 2 --, therefor.

On Sheet 3 of 3, FIG. "3", delete "FIG 3" and insert -- FIG. 3 --, therefor.

In the Specification

In Column 4, Line 13, delete "nd/or" and insert -- and/or --, therefor.

In Column 5, Line 35, delete "n≥2" and insert -- $n \geq 2$, --, therefor.

In Column 8, Line 34, delete "SiO2" and insert -- $SiO_2$ --, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,800,926 B2

In Column 8, Line 35, delete "TiO2" and insert -- $TiO_2$ --, therefor.

In Column 9, Line 19, delete "oxide oxide" and insert -- oxide --, therefor.

In Column 9, Line 53, delete "fluoro phlogopite." and insert -- fluorophlogopite. --, therefor.

In Column 17, Line 32, delete "FIG. 1d" and insert -- FIG. 1D --, therefor.

In Column 17, Line 60, delete "FIG. 1a" and insert -- FIG. 1A --, therefor.

In Column 18, Line 25, delete "FIG. 1b" and insert -- FIG. 1B --, therefor.

In Column 18, Line 58, delete "FIG. 1c" and insert -- FIG. 1C --, therefor.

In the Claims

In Column 20, Claim 1, Line 58, delete "comprising" and insert -- comprising: --, therefor.

In Column 20, Claim 1, Line 61, delete "layers, and" and insert -- layers, --, therefor.

In Column 21, Claim 6, Line 21, delete "comprising" and insert -- comprising: --, therefor.

In Column 21, Claim 8, Line 42, delete "compound:" and insert -- compound; --, therefor.

In Column 22, Claim 10, Line 9, delete "comprises" and insert -- comprises: --, therefor.